(12) United States Patent
Harlon et al.

(10) Patent No.: US 7,827,666 B2
(45) Date of Patent: Nov. 9, 2010

(54) ASSEMBLY, METHOD AND SYSTEM FOR ALIGNING A DRIVER TO A PUMP

(75) Inventors: Tommy B. Harlon, Waynesboro, GA (US); Benji J. Hodges, Sylvania, GA (US); Steve Thomas, Waynesboro, GA (US)

(73) Assignee: Southern Nuclear Operating Company, Inc., Birmingham, AL (US)

( * ) Notice: Subject to any disclaimer, the term of this patent is extended or adjusted under 35 U.S.C. 154(b) by 1113 days.

(21) Appl. No.: 11/508,695

(22) Filed: Aug. 23, 2006

(65) Prior Publication Data

US 2007/0044337 A1    Mar. 1, 2007

Related U.S. Application Data

(60) Provisional application No. 60/711,883, filed on Aug. 26, 2005.

(51) Int. Cl.
*G01M 19/00* (2006.01)

(52) U.S. Cl. .............. 29/407.09; 29/407.01; 29/525.01; 33/645

(58) Field of Classification Search ............... 29/407.01, 29/407.09, 525.01; 33/645
See application file for complete search history.

(56) References Cited

U.S. PATENT DOCUMENTS 5,222,306 A * 6/1993 Neumann ..................... 33/645

OTHER PUBLICATIONS

Harlon, Tommy B. "A Millwright's Guide to Motor/Pump Alignment," pp. 165A-165X, 1992.

* cited by examiner

*Primary Examiner*—Derris H Banks
*Assistant Examiner*—Azm Parvez
(74) *Attorney, Agent, or Firm*—Seyved Kaveh E. Rashidi-Yazd, Esq.; Ryan A. Schneider, Esq.; Troutman Sanders LLP

(57) ABSTRACT

The present alignment tool, method, and system improve the alignment of a driver to a motor. The alignment tool includes a securing ring, a track, and a rotatable ring. The rotatable ring of the alignment tool eliminates the onerous and dangerous rotation of the driver, or motor, previously required for aligning the motor to the pump.

18 Claims, 12 Drawing Sheets

ASSEMBLY, METHOD AND SYSTEM FOR ALIGNING A DRIVER TO A PUMP

CROSS REFERENCE TO RELATED APPLICATION

This application claims priority of U.S. Provisional Patent Application No. 60/711,883, filed 26 Aug. 2005, the entire contents of which is hereby incorporated by reference.

BACKGROUND

1. Field of the Invention

The present invention relates to aligning a driver to a pump and, in particular, to an alignment assembly, method, and system for aligning a motor to a pump that significantly increases the life of the pump by improving accuracy of motor shaft to pump shaft alignment, and further enhancing the safety of an alignment crew.

2. Description of Related Art

Aligning a driver (e.g., a motor) to a pump is an onerous, dangerous, time-consuming, and challenging task. To achieve proper alignment, exacting alignment between the centerline of a motor and the centerline of a pump is a must. A slight misalignment of the coupling of the motor and pump can result in a significant misalignment deep within the pump, which can cause many problems, such as reduced pump life, loss of derived income due to pump failure, and potential dangerous/fatal pump conditions. Further, misalignment between the motor and pump can cause other problems, including, but not limited to: extreme heat generated between a motor coupling and a pump coupling; severe wear in gear couplings; cracked or failed shafts caused by constant flexing; overload on bearings resulting from overheating and fatigue problems; as well as excessive radial/angular movement of rotating design seals.

Unfortunately, many pumps are never properly aligned with their driver, so misalignment and the attendant problems are common. This misalignment can be attributed to rushed alignment procedures so as to reduce the amount downtime of the pump, and/or because of faulty alignment methods/tools.

Conventional alignment solutions used include: (i) a reverse indicator alignment, (ii) a laser alignment, and (iii) a C or D frame adapter. The reverse indicator method is typically performed in only three stages. The first stage includes determining where the components are located in relationship to each other. The next stage includes calculating what components are to be moved and how far, whereby aligning the centerline of the driver with the centerline of the pump. And a last step is moving the hardware, normally the motor, into the desired position. This approach, obviously, can take an excessive amount of time due to the constant shifting/moving that may be required.

The laser alignment method performs similarly to the reverse indicator method, but instead of using analog or digital equipment to calculate the relationship between the motor and the pump, this alignment method uses laser equipment. By using the laser equipment, one is able to obtain precise measurements and, rather quickly, calculate the amount of movement between the components that are necessary. The components, or hardware, must still be moved, which is ordinarily the most difficult and time-consuming step of alignment.

Either a C frame adapter or a D frame adapter can be used to align a motor to a pump. Commonly, the C or D frame adaptors are useful for smaller sized jobs, and are not suitable for larger motors and pumps, due to size constraints of a housing of the motor to the pump.

In large pumps, for example, large vertical condensate pumps used in power plants, shaft alignment can be an extremely challenging task. Commonly, in these large pumps, a pump shaft and an impeller are rigidly coupled to a vertical flange-mounted motor. Obtaining meaningful alignment measurements becomes near impossible with the rigid or solid coupling.

When the rigid coupling remains connected and tightened, alignment measurements can not be measured conventionally (i.e., by rotating both coupled shafts), because no relative movement between the shafts is permitted, as would be the case with, for example, a flexible coupling. Instead, the solid coupling makes a rigid connection between the shafts, resulting in severe deflection of the shafts should misalignment exist.

Angular misalignment between the centerlines of rotation, however, can be evidenced by excessive vibration and wear at a first guide bearing of the pump shaft. If the couplings are completely disconnected, the pump shaft settles on the bottom of a pump pit and may be impossible to turn, even if (as is occasionally done) the pump shaft rests on a specially fitted conical seat to assist in controlling pump shaft play at the bottom of the pit. One key concern is that the shimming corrections for angularity that are performed at the motor flange must not result in changing the radial position of the pump shaft. Most unnecessary axial adjustments for pump component clearances occur via an adjustment nut positioned at the top of the pump shaft, as shim work involving the motor can be counter-adjusted by the adjustment nut. Further, thrust bearings of the motor are designed to carry the weight of the pump shaft. The pump shaft can be lifted from the lowermost resting place when spacing is established upon installing coupling bolts to the motor and pump couplings. The coupling bolts are tightened, and thus the pump shaft is lifted a controlled distance, to be supported by the thrust bearing of the motor. Providing that the motor is properly aligned to pump, the pump shaft will hang freely via the motor coupling. Accordingly, no portion of the pump shaft, impeller, or wear rings touches any solid or metallic portion; indeed, when properly aligned, the pump shaft rotates without touching anything other than the pumpage media (liquid, fluid, and the like).

Traditionally, alignment is performed with dial indicators, either of the analog or digital variety. Alignment is a tedious process taking significant time, and thereby is very costly.

In relation to power plant pump systems, it would be beneficial to provide a method and tool that could enhance industrial safety for both personnel and equipment during pump alignment, and further speed up the process of alignment. Presently, alignment methods are performed manually by rotating the motor shaft. A dial indicator is attached to the motor coupling and "tracked" around the face and rim of the stuffing box. The high breakaway force required to start the motor shaft rotating creates a personnel hazard.

Once the motor starts rotating, one mechanic must maintain rotor movement, while another mechanic reads and obtains the dial indicators, allthewhile dodging the rigging, which an extremely hazardous condition. Due to the potential for injury and even some resulting fatalities, the manual rotation of vertical motors of large vertical pumps must be limited, if not eliminated.

For example, a large vertical pump may need to be rebuilt and repositioned, connecting it to inlet and discharge piping. When repositioned, the motor is placed in an approximate position on top of the pump. A crew of seasoned mechanics is often assigned the task of aligning the motor to the pump. The mechanics bolt a rotation device to the motor coupling, wherein the rotation device can act as a handle by which a force to the motor can be jump-started. Essentially, the motor can be turned manually while indicators are mounted, adjusted, and monitored. Typically, due to the force required to keep the motor shaft rotating, at least two members of the crew must constantly manually turn the motor.

The jump-start of rotating the motor involves placing the rotation device to the motor coupling in a position where one of the handles aims out an open window of a coupling cage. This enables a loop of a nylon strap or chain, and a come-along to be attached providing the initial burst of power to jump-start rotation. During the initial rotation of the motor, the nylon strap drops free, and before the motors coasts down, the crew must continue to rotate the motor manually.

It is inevitable that during manual rotation, uneven lateral pressure on the motor will be applied. A rim indicator will register wherever it happens to be at the instant of actual reading, but one can not know if its position represents a truly centered motor shaft or not. Thus, manual jump-starting of a pump should be limited, if not eliminated, to protect workers. This can be accomplished by properly aligning the motor to the pump without such a jump-start procedure.

Placement of a rotor of a motor into action requires a large amount of torque. For instance, with a heavy rotor, such as an exemplary 4,500 horsepower condensate pump motor (which can weigh in excess of 13,000 pounds), getting a film of oil between the rotor and a motor thrust bearing to support rotation requires application of a large amount of torque. Some vertical pump motors, e.g., a reactor coolant pump motor, have a lift pump arrangement that minimizes the amount of torque required to place the motor into motion. Indeed, some component drive assemblies have turning gears that rotate the assembly upon engagement.

While the amount of torque required for maintaining rotor rotation is less than initial break away torque, maintaining application of this force can be difficult, as well as dangerous. An enclosure where the force must be applied is restricted, and further limits tools that can be used to create this rotation. This enclosure also requires access to an individual performing the drive and driven component alignment process. Commonly, designs of motors fail to consider this limitation and implementation of a turning drive assembly feature would be costly and prohibitive to most existing designs. Moreover, maintenance of components is usually not included in a component design.

FIG. 1 illustrates the motor 105 in communication with the pump 110. The alignment process of conventional systems requires the rotation of the motor shaft 115 and the motor coupling 120. This rotation is illustrated in FIG. 1 with the arrow. Rotation of the motor shaft 115 and the motor coupling 120 puts the alignment crew in harm's way, takes an excessive amount of time, and prohibits obtaining precise measurements.

Thus, it would be desirable to provide a system, method, and assembly of aligning a motor to a pump, which can be performed while the motor does not require rotation, wherein improving alignment time and safety. It is to such a system, method and assembly to which the present invention is primarily directed.

SUMMARY

The present invention is an assembly, method, and system for aligning a driver to a pump. The driver can commonly be a motor that is adapted to power the motor.

The alignment assembly, or tool, enables the aligning of a motor, which has a motor shaft in communication with a motor coupling, to a pump, which has a pump shaft in communication with a pump coupling. The alignment tool includes a securing ring, a track, and a rotatable ring. The securing ring is adapted to be carried by the motor coupling. Also, the securing ring includes a first portion and a second portion, wherein the first portion of the securing ring is coupleable to the second portion of the securing ring. The securing ring includes a perimeter, wherein the track is carried by the perimeter of the securing ring. The track includes an outwardly extending flange from the perimeter of the securing ring. In addition, the rotatable ring includes at least two bearings for rotating about the track, the at least two bearings carried by the track, wherein the bearings being carried by the track enable rotation of the rotatable ring.

A method of aligning a motor to a pump is also disclosed. The method includes providing an alignment tool coupled to the motor, the alignment tool having a portion being rotatable about the motor; indicating the alignment tool to the motor; and shifting the motor to correct for misalignment between the motor and the alignment tool.

The present invention also includes a system for aligning a motor to a pump. The system includes a securing ring, a track, and a rotatable ring. The securing ring is adapted to be carried by the motor coupling. The securing ring includes a first portion couplable to a second portion, and also includes a perimeter. The track is carried by to the perimeter of the securing ring, wherein the track includes an outwardly extending flange from the perimeter of the securing ring. The rotatable ring includes at least two bearings for rotating about the track. The at least two bearings are carried by the track, wherein the bearings being carried by the track enable rotation of the rotatable ring. The rotatable ring enables a non-rotation of the motor shaft for aligning the rotatable ring performs the rotation.

Further features of the invention, and the advantages offered thereby, are explained in greater detail hereinafter with reference to specific embodiments illustrated in the accompanying drawings, wherein like elements are indicated by like reference designators.

DETAILED DESCRIPTION OF EMBODIMENTS

To facilitate an understanding of the principles and features of the invention, it is explained hereinafter with reference to its implementation in an illustrative embodiment. In particular, the invention is described in the context of being an assembly, method, and system to align a driver to a pump. The invention can not only improve alignment with vertical pumps, but also angled or horizontal pumps.

The invention, however, is not limited to its use as an assembly (or tool), method, and system to align a driver to a pump. Rather, the invention can be used wherever an alignment tool to align one centerline of a shaft to another centerline is needed or desired. Thus, the alignment tool, method, and system described herein for aligning a driver to a pump can also find utility as a alignment tool, method, and system for a variety of devices that require aligning.

Additionally, the material described hereinafter as making up the various elements of the invention are intended to be illustrative and not restrictive. Many suitable materials that would perform the same or a similar function as the materials described herein are intended to be embraced within the scope of the invention. Such other materials not described herein can include, but are not limited to, materials that are developed after the time of the development of the invention, for example.

Figure 1:
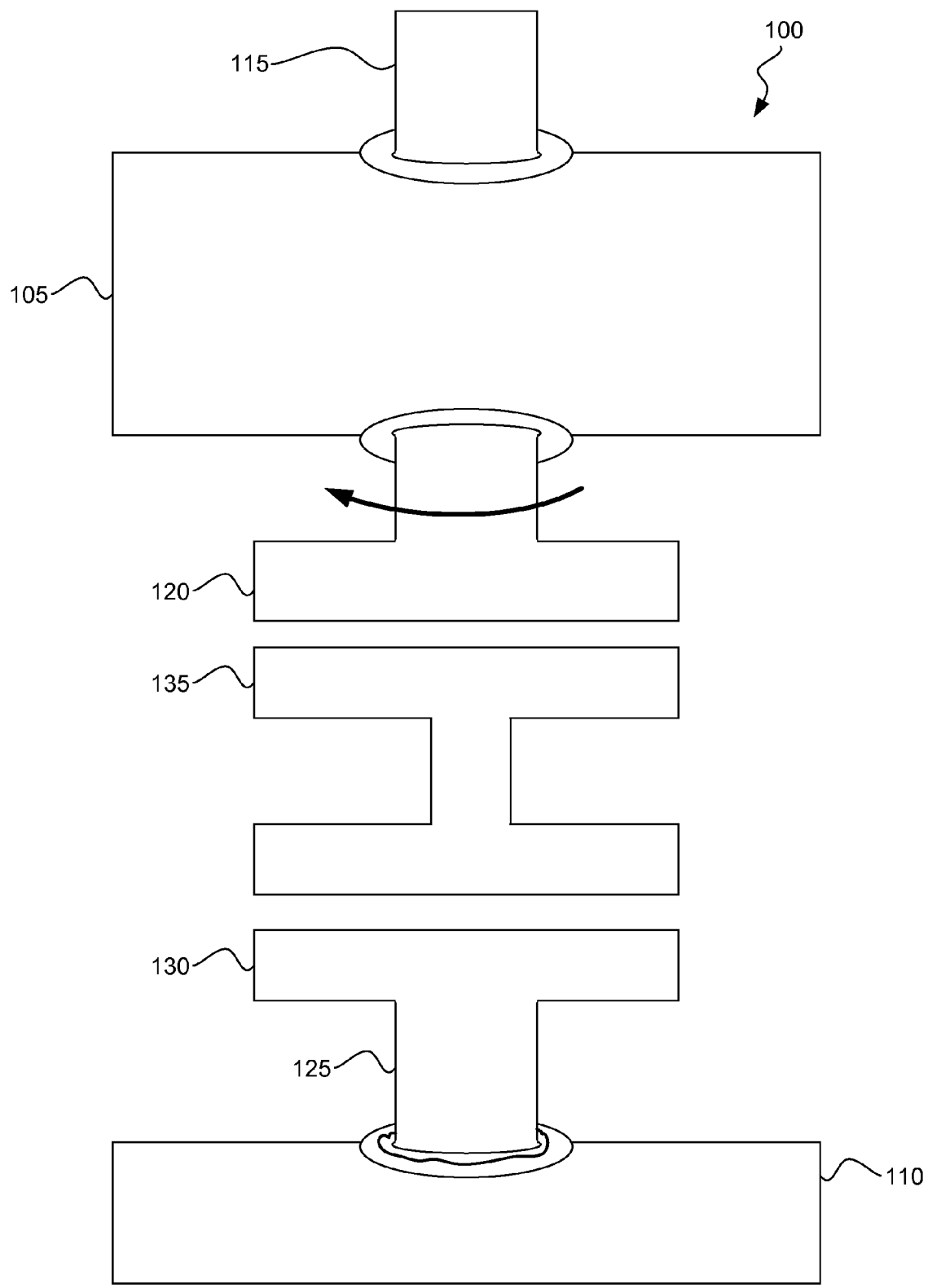
FIG. 1 illustrates a conventional system of aligning a driver to a pump, wherein rotation of the driver is essential.
Figure 2:
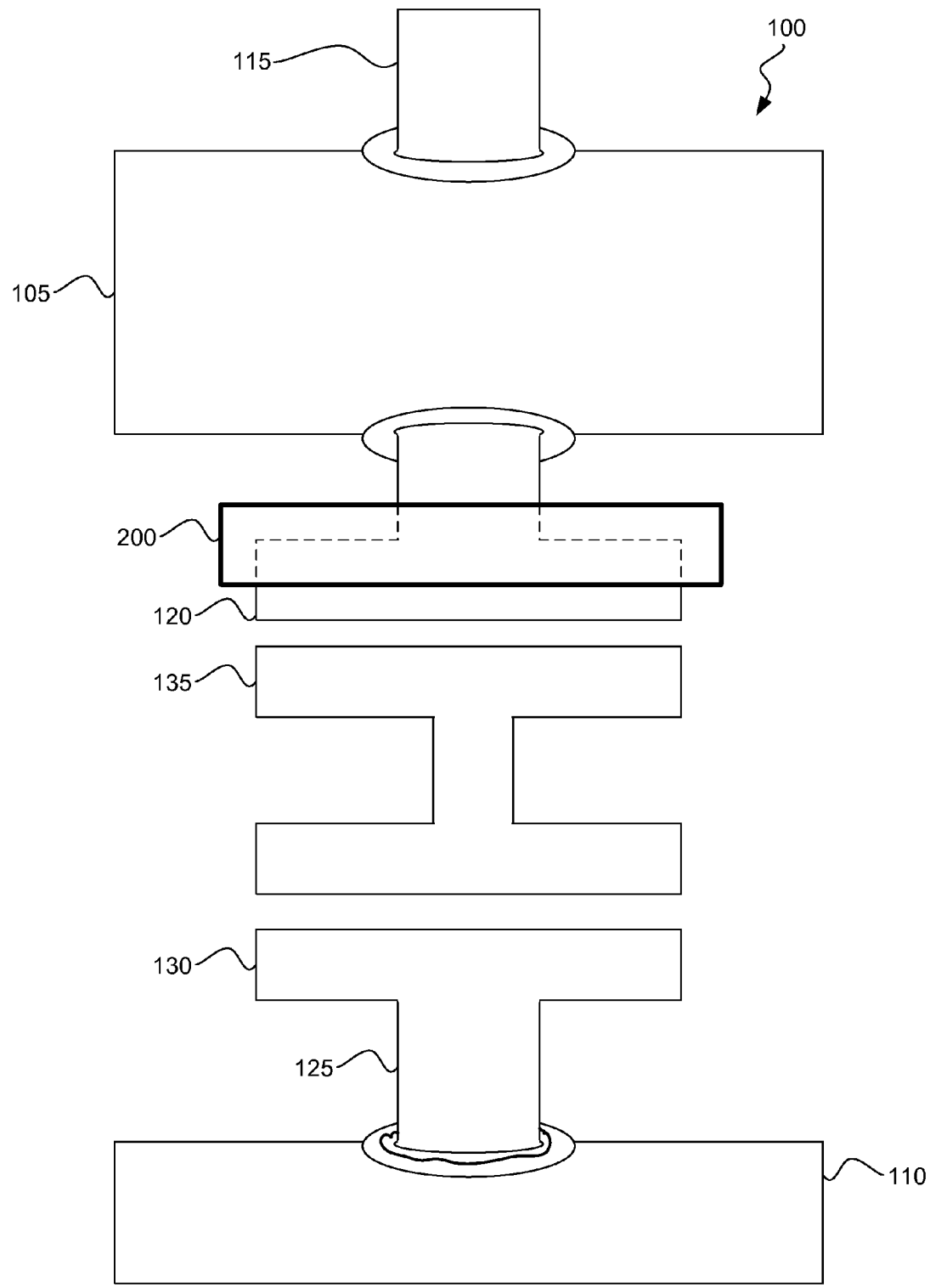
FIG. 2 illustrates a system of aligning a driver to a pump with an alignment assembly, in accordance with an exemplary embodiment of the present invention.

FIG. 2 illustrates a system having driver adapted to power a pump, in accordance with an exemplary embodiment of the present invention. A vertical driver/pump system 100 is shown in FIG. 2 and described herein; it would be appreciated by one skilled in the art, however, that horizontal or angled driver/pump systems exist and can be aligned. A system 100 in FIG. 2 depicts a driver 105, herein sometimes referred to as a motor, in communication with a pump 110. The motor 105 includes a motor shaft 115 in communication with a motor coupling 120, for powering the pump 110. In this vertical pump embodiment, the motor coupling 120 can be coupled to the bottom of the motor shaft 115. The pump 110, a mechanical device used to move gases, liquids, or slurries, includes a pump shaft 125 in communication with a pump coupling 130. The pump coupling 130 can be connected at the top of the pump shaft 125.

In an exemplary embodiment, the motor 105 can be an electrical motor, although other types of motors can be used. The size of the motor 105 can be dependent on the size of the pump 110 that is to be driven. The position of the motor 105 can vary, as the motor 105 can be positioned vertically, horizontally, or at another angle, to power a vertical pump, a horizontal pump, or an angled pump, respectively, depending on the functionality and needs of the pump 110.

The motor 105 operates to rotate the motor shaft 115. As the motor shaft 115 rotates that which is connected to the motor shaft 115 also rotates. In an exemplary embodiment, the motor coupling 120 is connected to the motor shaft 115, and thus rotation of the motor shaft 115 rotates the motor coupling 120.

The pump 110 preferably is powered by the motor 105. In order for the pump 110 to operate, the pump 110 must be connected to the motor 105. Such a connection is usually made via the pump coupling 130 connected directly to the motor coupling 120. In one embodiment, this connection is accomplished by bolting the two couplings 120 and 130 together through a number of symmetrically positioned bolts. In another embodiment, the pump coupling 130 can be bolted to a removable spool piece or spacer 135, which is also bolted to the motor coupling 120. The removable spool piece 135 can allow for mechanical seal removal without the need of removing the motor 105.

After an alignment process has been performed to align the centerline of the motor 105 to the centerline of the pump 110, the motor coupling 120 is placed into a predetermined position. Then, based on the requirements and characteristics of the pump 110, the pump shaft 125 and the pump coupling 130 are raised by being bolted the motor coupling 120; this is called pump raise. The pump shaft 125, which is connected to the pump coupling 130, must be raised off the bottom of the pump 110 to enable proper operation of the pump 110.

Having described the system 100 in which the motor 105 can power the pump 110, the alignment system, method, and assembly will be described. Of course, one skilled in the art would appreciate that the alignment system can be used in an environment different from that which is disclosed in FIG. 2. An alignment assembly 200, or tool, is an improvement over the prior art, as it allows a motor 105 and a pump 110 to be aligned, while not requiring rotation of the motor 105.

The alignment tool 200 is adapted to be positioned on a top of the motor coupling 120, as illustrated in FIG. 2.

Figure 3:
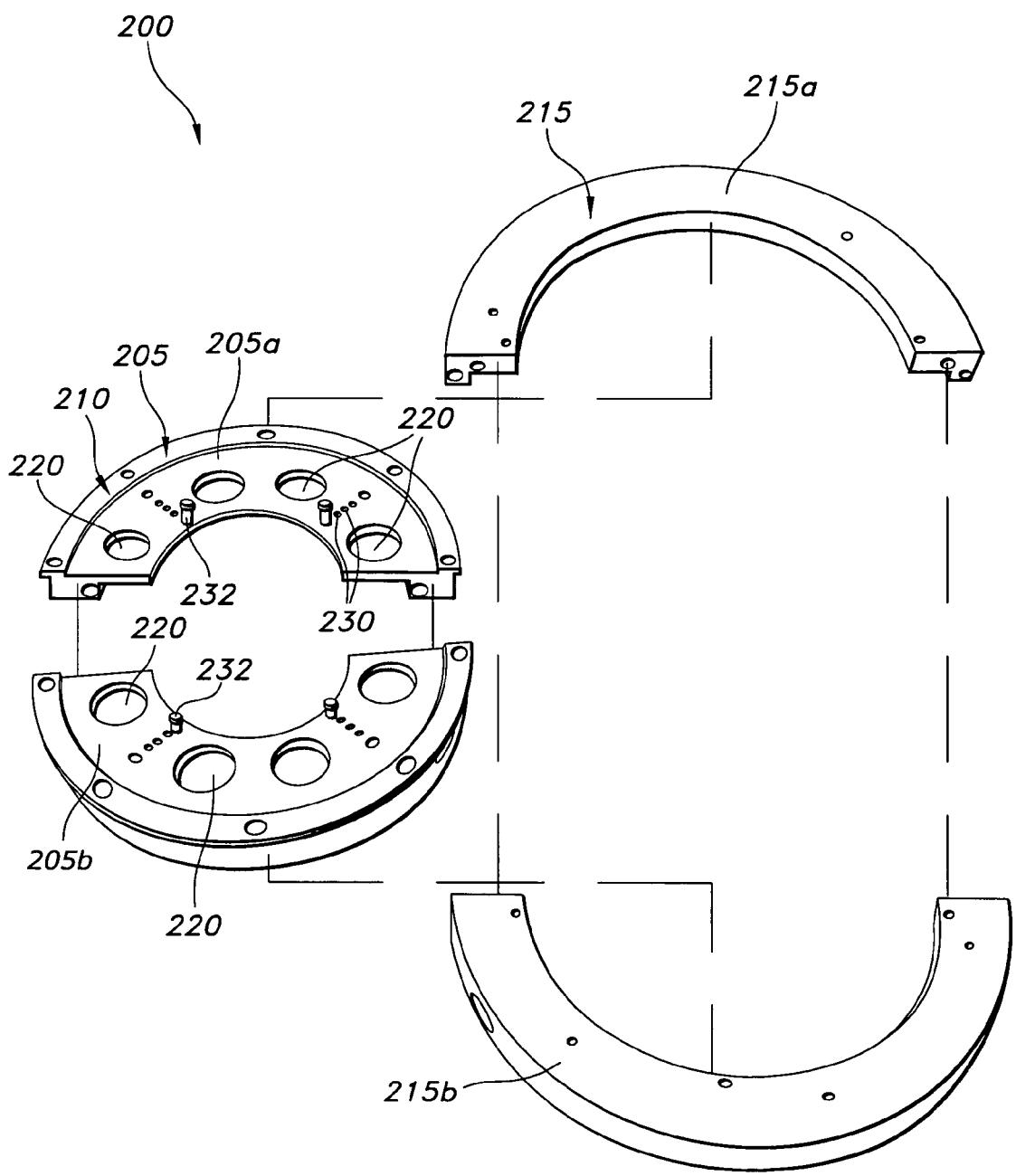
FIG. 3 illustrates an exploded view of the alignment assembly, in accordance with an exemplary embodiment of the present invention.

FIG. 3 illustrates an exploded view of an alignment assembly, in accordance with an exemplary embodiment of the present invention.

Aligning with the alignment tool 200 can decrease the possibility of shaft misalignment, which can cause significantly higher bearing loads in the radial direction, overloads in both the pump and motor bearings, and high vibration levels in the components. The tool 200 makes performing alignments more accurate and safe. Also, the tool 200 can decrease the number of personnel required to perform the conventional alignment work, and further minimize time spent in the alignment process.

The alignment tool 200 has several benefits that provide for worker safety and increase the accuracy of the alignment process, by enabling more time to take the readings and removing some additive tolerances.

Furthermore, the tool 200 enables less supervision of personnel during their job. Accordingly, this permits the personnel to concentrate on instrument (e.g., a dial indicator) readings and resulting actions of motor frame movements on the component alignment, further enhancing safety.

The tool 200 also is adapted to increase the accuracy of the alignment process. The assumption for locating a mechanical bearing center of the motor is obtained by performing checks in the air gap, or clear distance, between a motor stator and the rotor. Motor bearing placement is often a result of this measurement. In fact, most large motor bearings are journal bearings, which have clearances between a shaft and a bearing.

While rotating the motor inside the journal bearings very slowly, there is insufficient force to obtain an oil wedge, in a non-pressurized lubricant system, to ensure the bearing center is maintained. One step includes placing the motor in the mechanical center of the bearings, wherein the motor is physically restrained in that position during the alignment process. Consequently, this removes the accumulation of tolerances that can occur with the motor shaft free to move around in the journal bearing clearances.

Preferably, the present tool 200 is designed to perform alignment of large pumps, for example, the alignment tool 200 can perform the alignment of a circulating water pump that is capable of controlling liquid flow rates in excess of 250,000 gallons/minute.

The alignment tool 200 can be adapted for use with vertical pumps, which can include a removable spool piece 135 in the coupling allowing mechanical seal removal without motor removal. Further the alignment tool can be adapted for use with vertical pumps that contain a closed coupling, or a system that does not contain a removable spool piece 135.

In a vertical system, the alignment tool 200 can preferably mount around the top exterior of the motor half of the coupling 120, versus on the bottom face of the motor coupling 120 half. Using the present alignment method, the duration of alignment time for a typically condensate pump/motor, for instance a 4,500 horsepower motor weighing 52,000 pound sitting atop a Flowserve APKD8 pump, is cut with the tool 200 from an average of 14 hours, to an average of 6 hours. Further, crew size is cut from a minimum of four people with conventional processes, to a crew size of three with the present invention. Besides the savings in man-hours (cost), this has a major impact in pump outage schedules. The cost savings of using the present alignment tool 200 is reflected in the man-hours required to perform the initial alignment task as well as extending the life of components of both the pump 110 and motor 105.

By using the tool 200, a large impact in cost savings comes from the increased accuracy of the motor-to-pump alignment, and the related effect on increased reliability of the vertical pumps and motors. Based on the conventional alignment tool/method, the accuracy of the present alignment can be increased at least five-fold, which significantly extends the life of both pump and motor by decreasing dynamic loads on the component bearings.

In addition, the alignment tool 200 improves alignment, as the tool 200 can align the motor 105 to the pump 110 within approximately 0.001 of an inch with minimal effort. Without rotating the motor shaft 115, the tool 200 projects the motor shaft 115 centerline up or down, performing all rotational and mounting requirements for dial indicators to interface with the register fits of the pump.

The alignment assembly, or tool, 200 for improving alignment of the motor 105 to a pump 110 includes a securing ring 205 for securing to the motor coupling 120, a rotation assembly, or track, 210 connected to the securing ring 205, and a rotatable ring 215 adapted to rotate about the track 210.

The securing ring 205 of the alignment tool 200 is adapted to be carried by the motor 105, preferably the motor coupling 120. The securing ring 205 can include at least two split portions, such as a first portion 205a and a second portion 205b. The first portion 205a is couplable to the second portion 205b by, for example, one or more bolts, or like connection device. In a preferred embodiment, the first portion 205a and the second portion 205b can be two half-circles, couplable to make a fully circular ring. In this arrangement, the securing ring 205 can cooperatively fit around a circular motor shaft 115. If the securing ring 205 were integrally one piece, the ways the securing ring could attach to another member, in this case the motor coupling 120, would be by directly sliding onto the member, or having an external securing mechanism, which could interfere with the operation of the alignment tool 200.

Figure 4:
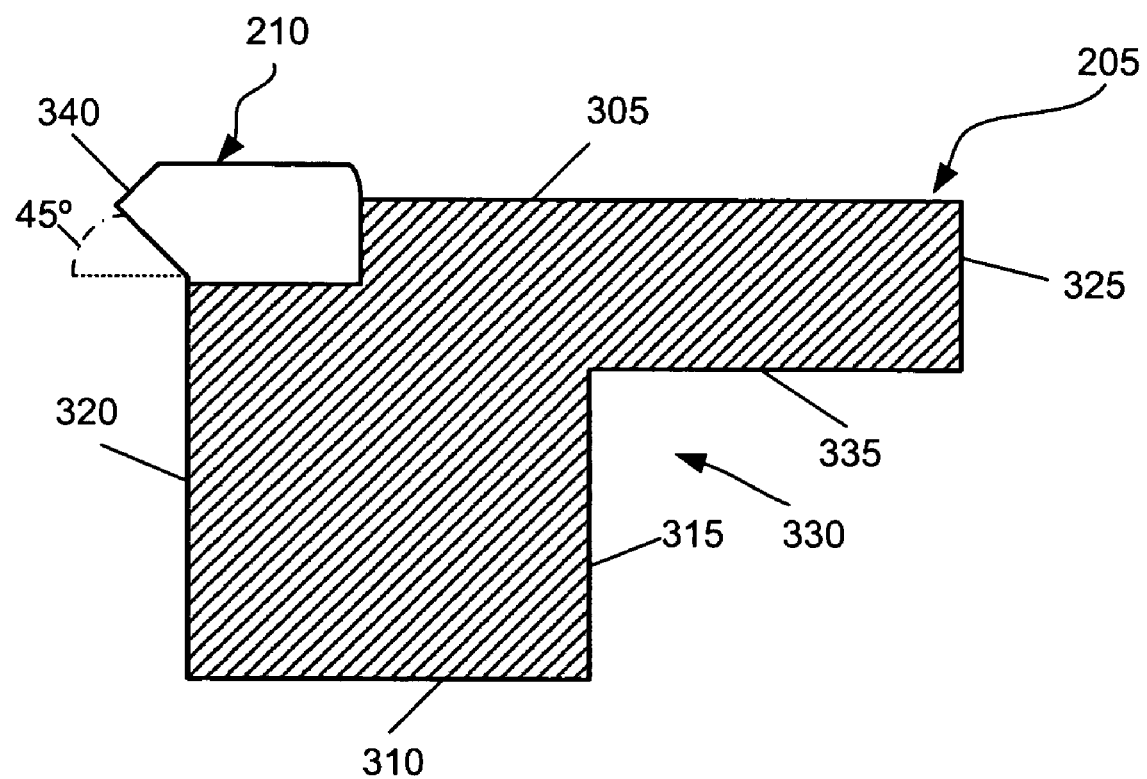
FIG. 4 illustrates a cross-sectional view of a securing ring of the alignment assembly, in accordance with an exemplary embodiment of the present invention.

FIG. 4 illustrates a cross-sectional view of the securing ring of the alignment assembly, in accordance with an exemplary embodiment of the present invention. As shown in FIG. 4, the securing ring 205 includes a top 305, a bottom 310, an inner perimeter 315, and an outer perimeter 320. The top 305 can extend inwardly beyond the inner perimeter 315 to form a top inner perimeter 325. Accordingly, an approximate L-shape cavity 330 is formed from the bottom 310 along the inner perimeter 315 to a bottom 335 of the inwardly extending top 305. Hence, the bottom 335 of the inwardly extending top 305 can be approximately 90 degrees with respect to the inner perimeter 315. The bottom 335 of the top 305 can be adapted to rest atop of the motor coupling 120. This L-shape cavity 330, or below the inwardly extending top 305, can also include fastening mechanism (not depicted) to further engage the motor coupling 120 to carry the securing ring 205.

Figure 5:
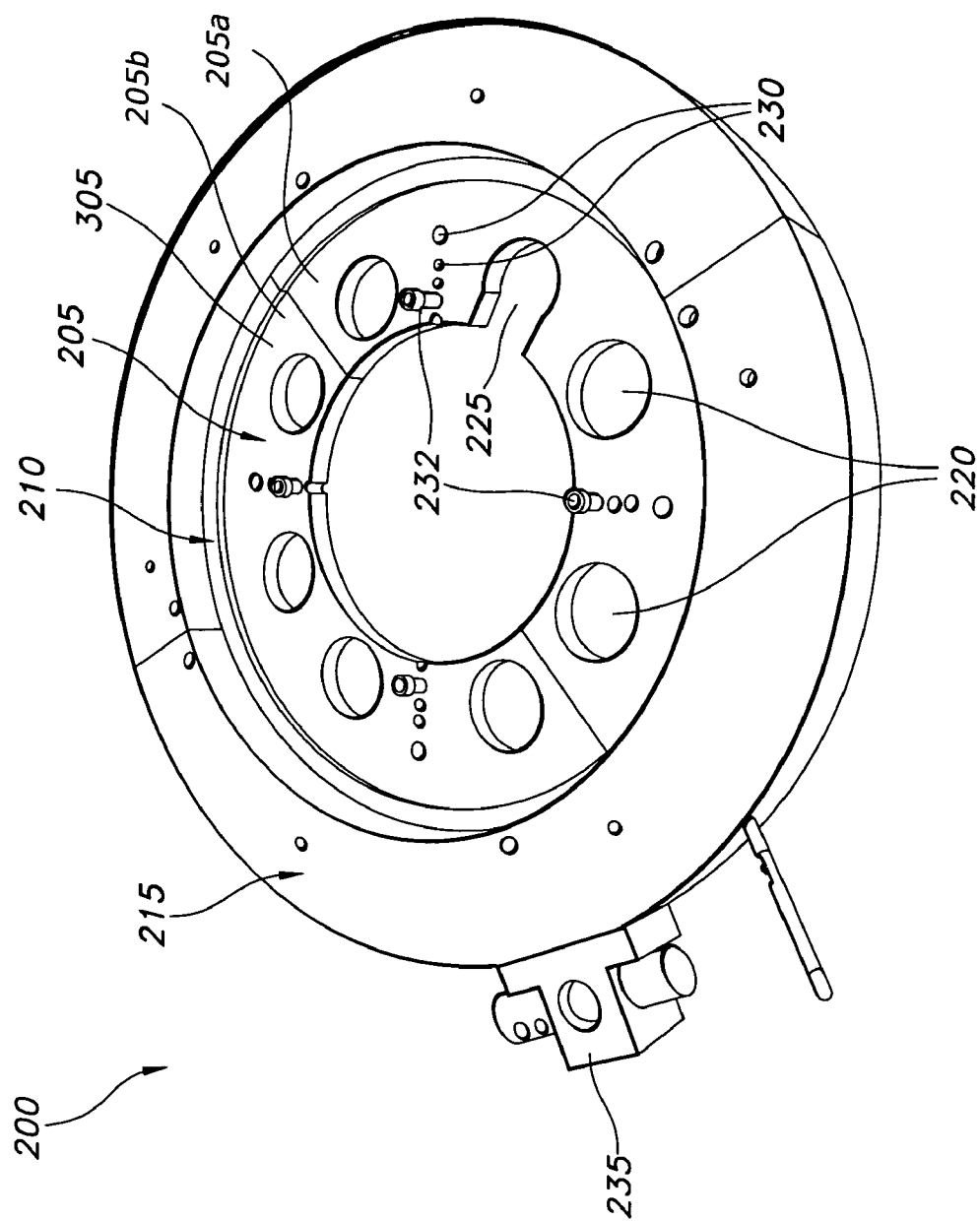
FIG. 5 illustrates a perspective view of the alignment assembly, in accordance with an exemplary embodiment of the present invention.

FIG. 5 illustrates a perspective view of the alignment assembly 200 fully assembled, in accordance with an exemplary embodiment of the present invention. The inwardly extending top 305 of the securing ring 205 includes a plurality of symmetrically spaced apertures 220 for reducing the total weight of the securing ring 205. By having a lower weighted securing ring 205, the overall weight of the alignment assembly 100 is reduced, thereby easing the task of attaching the alignment assembly 100. In a preferred embodiment, the first portion 205a and the second portion 205b both include at least four defined apertures 220. The apertures 220 can be preferably circular in shape, although as one skilled in the art would appreciate other shapes can be implemented.

Of course, the securing ring 205 need not have apertures to lower its weight, which can be otherwise had by the selection of strong, but relatively lightweight material.

Due to weight constraints, it is preferred that the securing ring 205 be composed of such a lightweight material, with or without apertures. For example, the securing ring 205 can be made of a lightweight metal, being aluminum, titanium, magnesium, combinations thereof, and the like. Preferably, aluminum is used for cost savings and easy workability.

In an exemplary embodiment, at least one aperture 220 is a key way 225. The key way 225 can receive an extending section of the motor 105 and, thus, enables a flush connection between the securing ring 205 and the motor 105.

The top 305 of the securing ring can also include a plurality of drilled holes 230 for further securing the securing ring 205 to the motor 105. The holes 230 can be tapped with threaded screw ports enabling easy insertion of screws or bolts 232. Then, the screws or bolts 232 can be inserted into the holes 230 and terminate at the top of the motor coupling 120.

Along the outer perimeter 320 of the top 305 of the securing ring 205 is the rotation assembly or track 210. The track 210 includes an outwardly extending flange 340 from the outer perimeter 320 of the securing ring.

In a preferred embodiment, as shown in FIG. 4, the flange 340 of the track 210 can angle approximately 45 degrees from the outer edge of the track 210 to the outer perimeter 320 of the securing device 205 for optimum guidance of a bearing along the track 210.

Preferably, the track 210 is composed of a material different than that of the securing ring 205. For example, the track 210 can be made of a harder metal, such as steel. The track 210 can be composed of steel, stainless steel, carbon steel, aluminum, iron, lead, nickel, tin, titanium, and the like, or combinations thereof.

The track 210 can have a ring shape that rests along the periphery of the securing ring 205. The track 210 can include a plurality of defined apertures adapted to receive a screw, preferably a flat head screw, to affix the track 210 to the securing ring 205. The track enables the rotatable ring 215 to rotate around the track 210, and, thus, around the securing ring 205.

Figure 6:
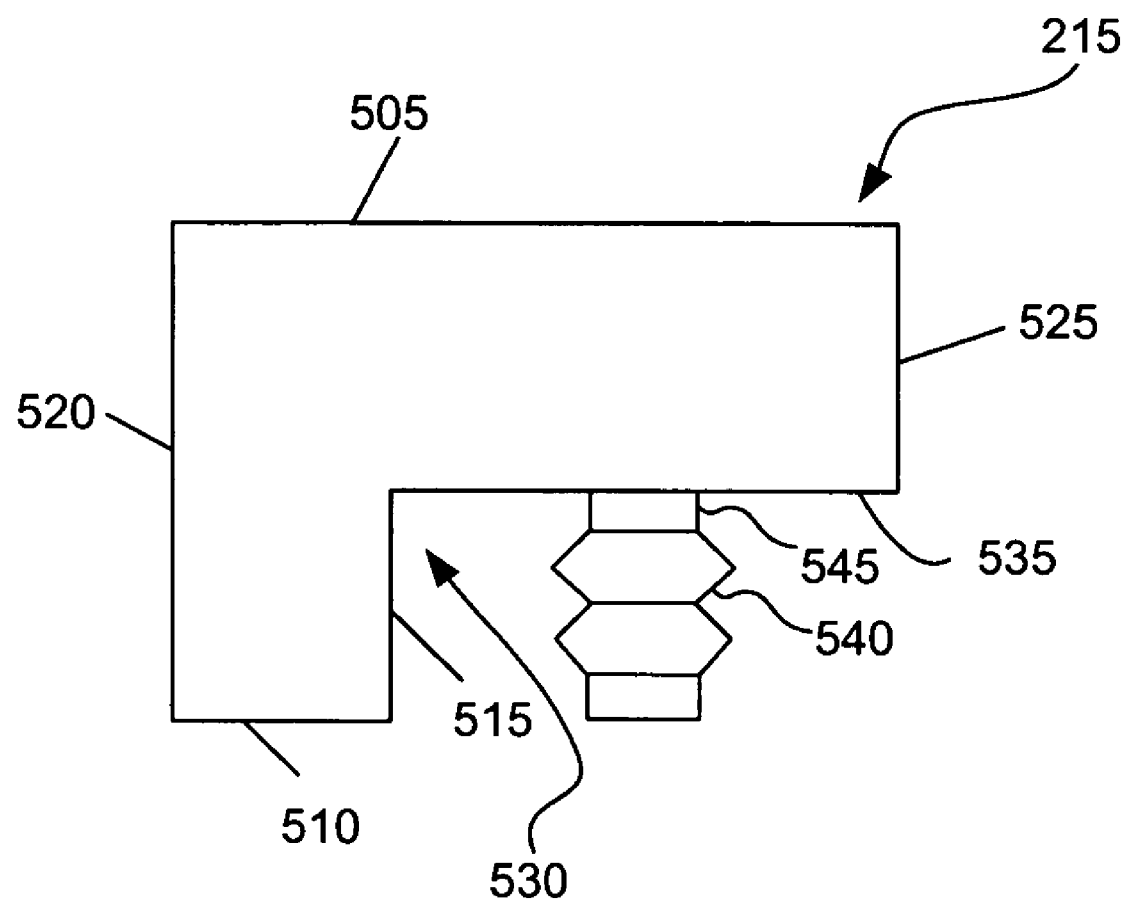
FIG. 6 illustrates a cross-sectional view of a rotatable ring of the alignment assembly, in accordance with an exemplary embodiment of the present invention.

FIG. 6 illustrates a cross sectional view of the rotatable ring having a bearing, in accordance with an exemplary embodiment of the present invention. The rotatable ring 215 includes a top 505, a bottom 510, an inner perimeter 515, and an outer perimeter 520. The top 505 can extend inwardly beyond the inner perimeter 515 to form a top inner perimeter 525. Accordingly, an approximate L-shape cavity 530 is formed from the bottom 510 along the inner perimeter 515 to a bottom 535 of the inwardly extending top 505. Hence, the bottom 535 of the inwardly extending top 505 can be approximately 90 degrees with respect to the inner perimeter 515.

The rotatable ring 215 can also include split portions, such as a first portion 215a and a second portion 215b, as shown in FIG. 3. The first portion 215a is couplable to the second portion 215b by one or more bolts, or like connection device. In a preferred embodiment, the first portion 215a and the second portion 215b can be two half-circles. In this arrangement, the rotatable ring 215 is large enough to surround the track 210. If the rotatable ring 215 were one piece, that is, comprised only one portion, the ways the rotatable ring 215 could attach to another member would be by directly sliding onto the member, or having an external securing mechanism, both of which would likely interfere with the operation of the alignment assembly 200.

In the L-shaped cavity 530, each portion 215a and 215b includes at least one bearing 540, as depicted in FIG. 6, totaling at least two bearings for the rotatable ring 215. Depending on the size of the motor 105 that the alignment tool 200 is coupled to, the number of bearings can increase. Indeed, in a preferred embodiment, each portion 215a and 215b includes three symmetrically positioned bearings 540 in the L-shaped cavity 530.

The bearings 540, preferably grooved roller bearings, enable the rotatable ring 215 to rotate about the track 210, wherein the at least two bearings 540 can glide upon the track 210. The bearings 540 are adapted to receive the flange 340 of the track, when the rotatable ring 215 is coupled to the securing ring 205. The bearings 540 extend downwardly from the bottom 535 of the top 505. The bearings 540 can include a stand-off washer 545 to prevent the entire flat surface of the bearings 540 from scrubbing against the bottom 535 of the rotatable ring 215.

As FIG. 5 illustrates, the rotatable ring 215 of the alignment tool 200 further includes a tool connection member 235 outwardly extending from the outer perimeter 520 for securing a measuring tool. In an exemplary embodiment, the measuring tool can be a dial indicator, a digital dial indicator, a laser, a C frame adaptor, a D frame adaptor, and the like. The measuring tool enables taking the measurements of the alignment tool 200 with respect to the motor 105 and the pump 110. For example, the required measurement about the motor 105 can be taken by rotating the rotatable ring 215, instead of conventional method of measuring which required rotating the motor shaft, which is a difficult, dangerous, and time consuming task.

Figure 7:
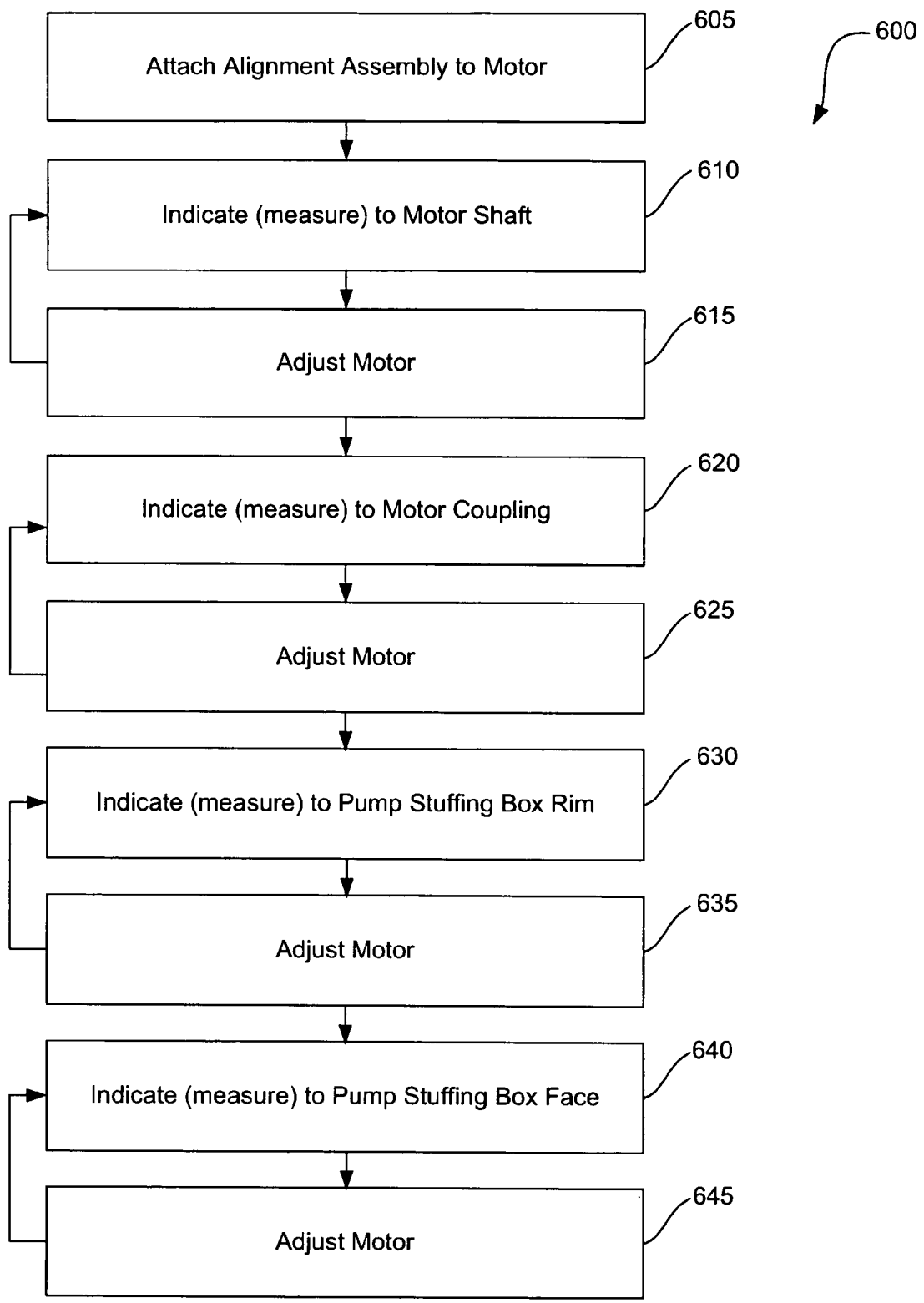
FIG. 7 is a flow-chart illustrating a method of operating the alignment assembly and aligning a driver to a pump, in accordance with an exemplary embodiment of the present invention.

Referring now to FIG. 7, a flow-chart illustrating a method of aligning the motor to the pump with the alignment assembly, in accordance with an exemplary embodiment of the present invention, is shown. One method of aligning the motor to the pump using the alignment tool 200 includes a number of steps. The first step of the method 600 begins at step 605.

The first step 605 in attaching the alignment assembly 200 to the motor is to secure the securing ring 205 to the motor 105. As described, the securing ring 205 is preferably attached to a top the motor coupling 120 of the motor 105. In most embodiments, the motor coupling 120 is coupled to the motor shaft 115 at a terminus of the motor shaft 115, wherein the motor coupling 120 can also be positioned perpendicular to the shaft 115. In vertical pump alignment, the securing ring 205 can initially hang from the motor coupling 120 (by the bottom 335 of the top 305) before the securing ring 205 can be connected. To attach the securing ring 205, the two portions 205a and 205b are bolted to one another. Furthermore, a bolt insertable from the top 305 of the securing ring 205 can terminate at the top of the motor coupling 120, and a fastening mechanism in the L-shaped cavity 330 can engage the sides of the motor coupling 120. As a result of this attachment, the securing ring 205 is static and will not move during the method of alignment.

Because the track 210 is integral with the outer perimeter 320 of securing ring 205, there is no need to attach it. It is already attached.

The next step in attaching the alignment tool 200 to the motor 105 is to position the bearings 540 of the rotatable ring 215 onto the track 210. The bearings 540 are adapted to receive the flange 340 of the track 210. Because the rotatable ring 215 includes two portions 215a and 215b, after the flange 340 engage the bearings 540, the two portions 215a and 215b can be bolted to one another. Upon securing the rotatable ring 215 to the track 210, the rotatable ring 215 is adapted to rotate about the motor shaft 115, the motor coupling 120, the securing ring 205, and the track 210.

Finally, a measuring tool 650, or indicating element, should be attached to the tool connection member 235. The measuring tool 650, which is rotatable with the rotatable ring 215, enables the necessary measurements of the alignment of the motor 105, with respect to the pump 110, to be taken.

Having now secured the alignment assembly 200 to the motor 105, the next step in this method of aligning is step 610. Step 610 is when the first measurement of the motor 105 is taken. Preferably, the measuring tool 650 is used to measure the relationship of the alignment assembly 200 with respect to the motor shaft 115. Typically, this is performed with dial indicators, although other measuring tools are available and can be used. The measuring tool 650 revolves around the motor shaft 115, about the rotatable ring 215, wherein measurements are taken at least at East, West, North and South positions. Because the measuring tool 650 can be adapted to take measurements from the same distance/position from the alignment assembly 200, determining the centerline of the motor shaft 115 is easier than rotating the entire shaft 115 with respect to an alignment tool 200. Also, the precision of these measurements is improved.

Depending on the readings taken, the motor shaft 115 may need to be shifted. This is performed in the next step, or at 615.

If necessary, the measurement with respect to the motor shaft 115 may need to be repeated. If so, step 610 is, again, performed.

After the motor shaft 115 is positioned, measurements of the motor coupling 120 with respect to the alignment tool 200 are taken, at step 620. Like the measuring of the motor shaft 115, the motor coupling 120 is taken from at least four different positions—East, West, North and South. Based on these readings, the motor coupling 120 may need adjusting. If so, step 625 is performed.

Depending on the readings taken, the motor coupling 120 might need to be shifted. This is performed in the next step, or at 625.

If necessary, the measurement of the motor coupling 120 may need to be repeated. If so, step 620 is, again, performed. Likewise, due to shifting of the motor coupling 120, the measurements on the motor shaft 115 may need to be repeated, therefore the process would lead back to step 610.

The next step 625 is when the alignment tool 200 is measured with respect to the pump 110. The pump 110 is stationary and can not move. The centerline of the pump 110 is determined with respect to the stuffing box. The pump 110 is measured with respect to the stuffing box face 670 and the stuffing box rim 665.

Step 630 is the step where the alignment tool 200 is measured with respect to the stuffing box rim 665. These measurements are taken at four different positions—East, West, North and South—to determine offset of the alignment tool 200. If there is an offset, at step 635, the motor 105 is adjusted as necessary. As a result, previous steps may need to be repeated.

Step 640 is the step where the alignment assembly 200 is measured with respect to the stuffing box face 670. Again, these measurements are taken from at least four different positions—East, West, North and South—to determine offset of the alignment assembly 200. If there is an offset, at step 645, the motor 105 is adjusted as is required. As a result, previous steps may need to be repeated.

This method is a dynamic process, wherein steps may need to be repeated, based on adjustments to the motor 105. Because the pump 110 is fixed, the motor 105 is the component being moved.

Eventually, after a few revolutions of the rotatable ring 215, and measurements taken, the centerline of the motor 105 aligns with the centerline of the pump 110. Then, the motor coupling 120 is bolted to either a spool 135, which is coupled to the pump coupling 130, or directly to the pump coupling 130.

Figure 8:
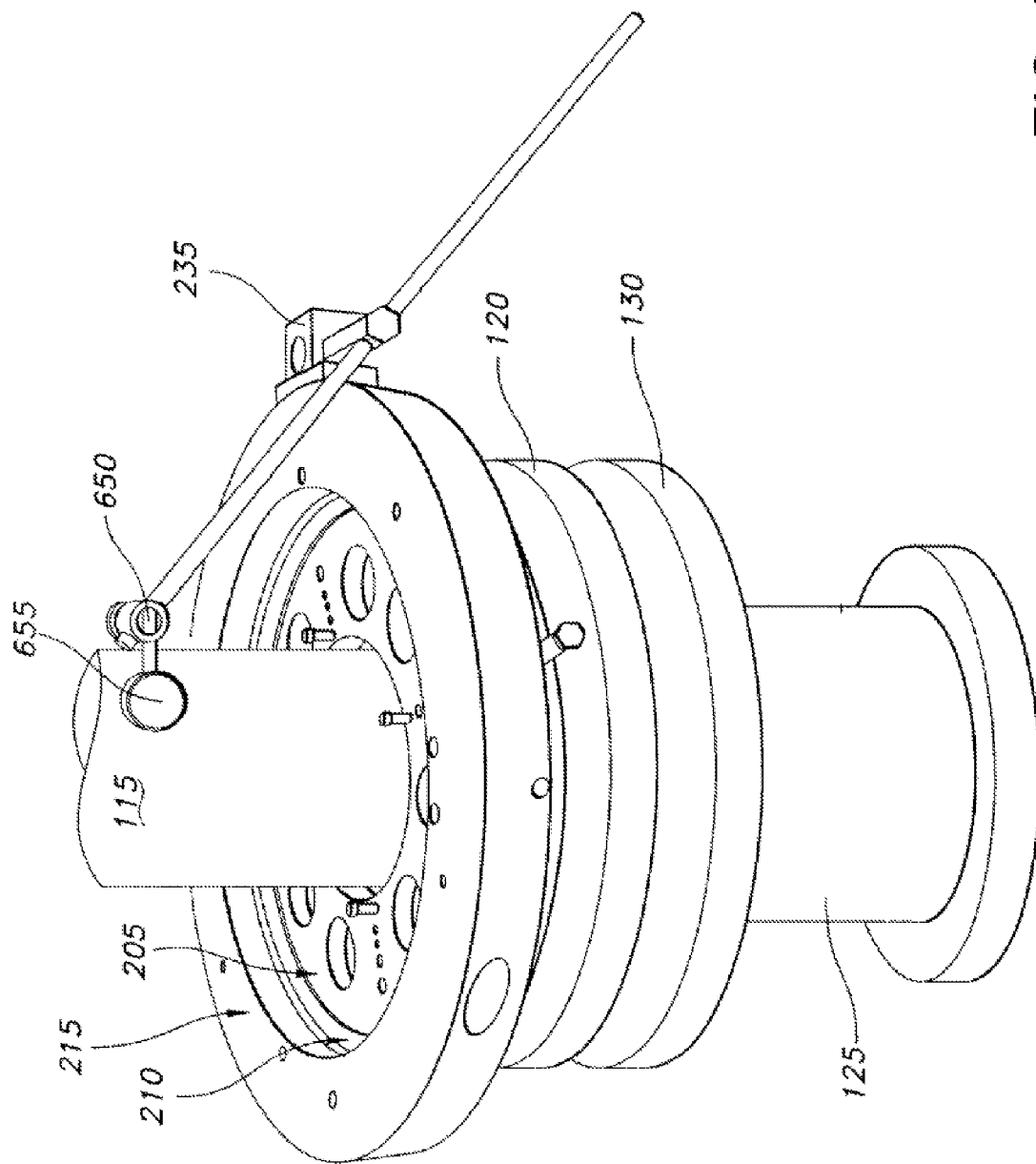
FIG. 8 illustrates a perspective view of a measuring tool extending from the alignment assembly to indicate to the motor shaft, in accordance with an exemplary embodiment of the present invention.
Figure 9:
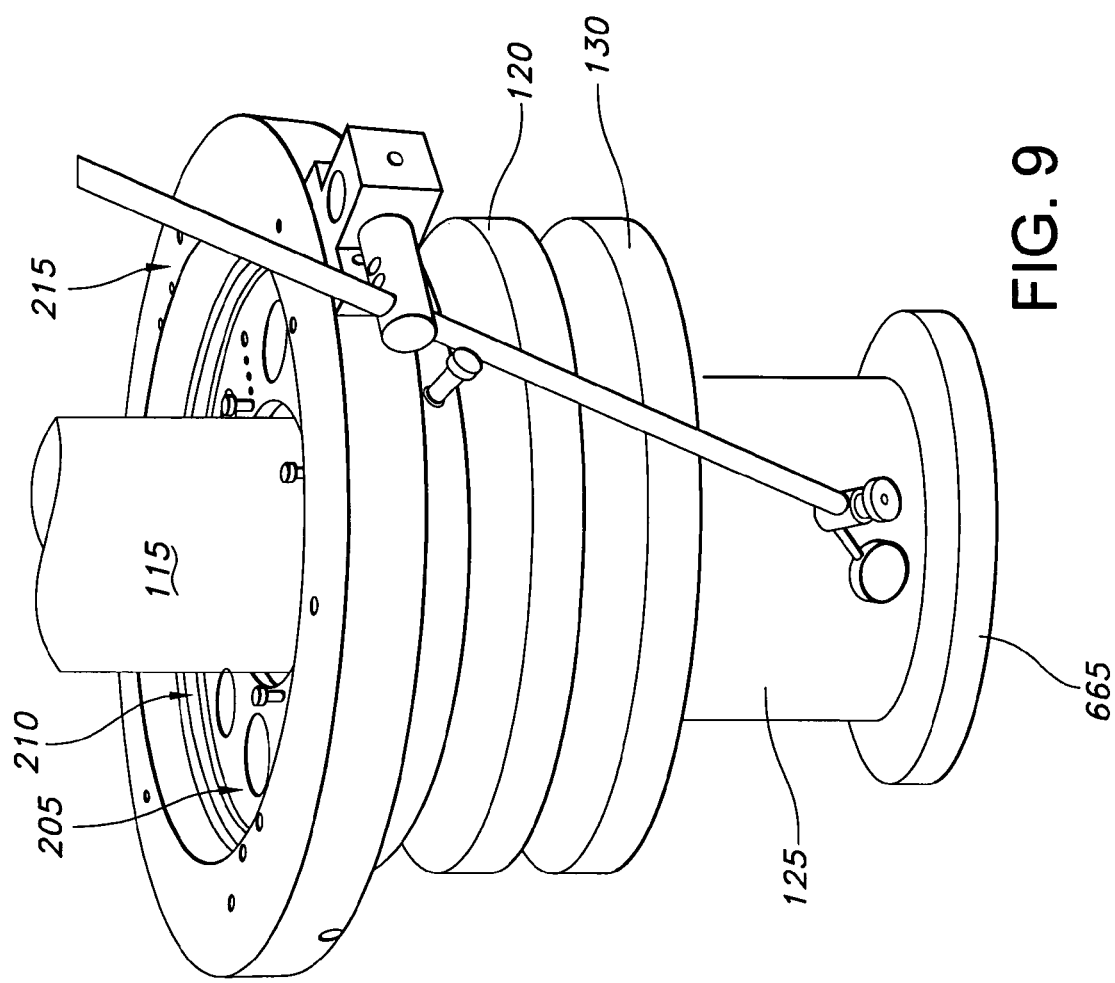
FIG. 9 illustrates a perspective view of a measuring tool extending from the alignment assembly to indicate to the stuffing box rim of the pump, in accordance with an exemplary embodiment of the present invention.
Figure 10:
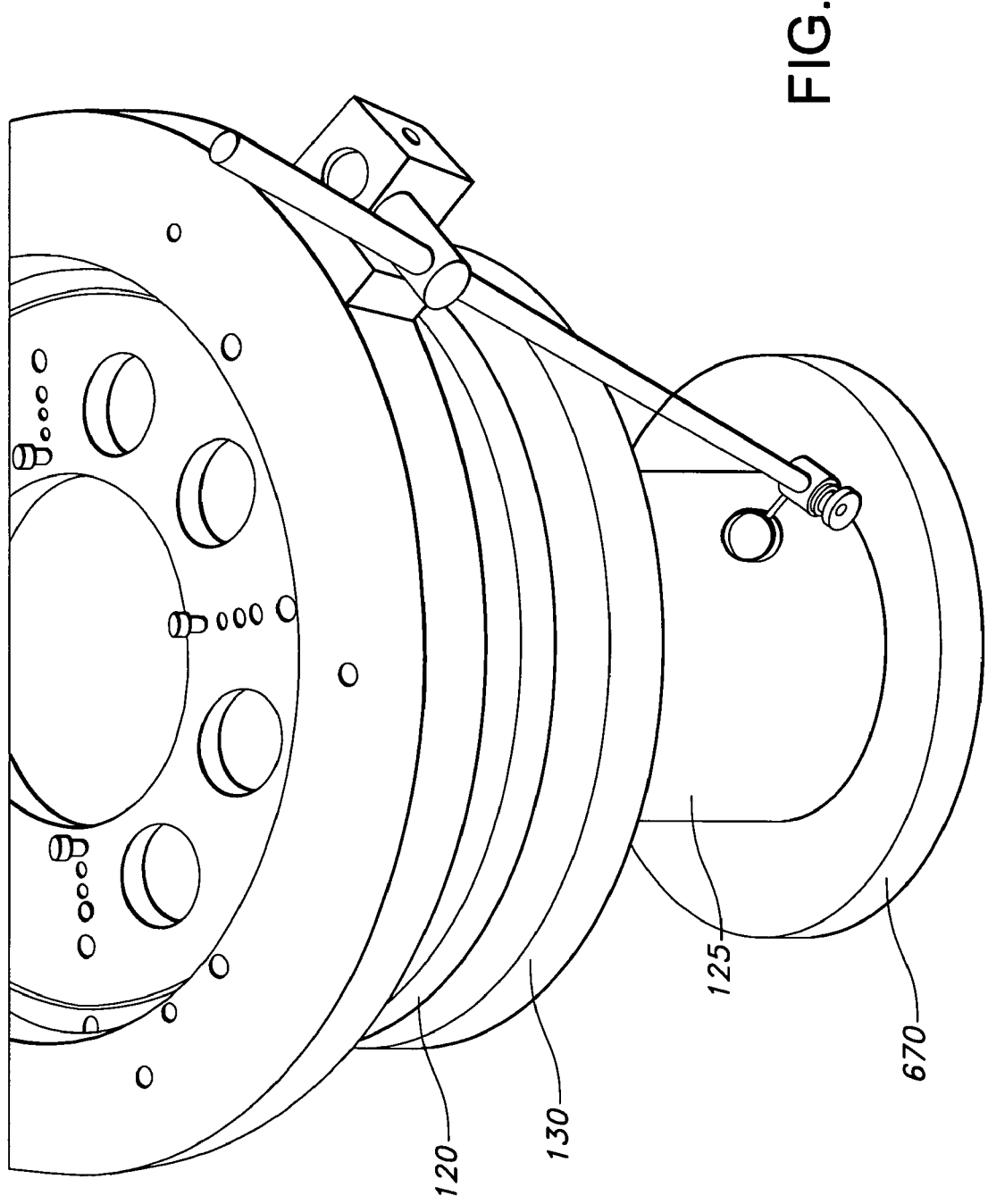
FIG. 10 illustrates a perspective view of a measuring tool extending from the alignment assembly to indicate to the stuffing box face of the pump, in accordance with an exemplary embodiment of the present invention.

Referring now to FIGS. 8-10, the steps of method are illustrated, including measuring at the motor, the stuffing box rim of the pump, and the stuffing box face of the pump, in accordance with a preferred embodiment of the present invention. FIG. 8 illustrates a perspective view of a measuring tool extending from the alignment tool to indicate to the motor shaft, in accordance with an exemplary embodiment of the present invention. FIG. 9 illustrates a perspective view of a measuring tool extending from the alignment tool to indicate to the stuffing box rim of the pump, in accordance with an exemplary embodiment of the present invention. FIG. 10 illustrates a perspective view of a measuring tool extending from the alignment tool to indicate to the stuffing box face of the pump, in accordance with an exemplary embodiment of the present invention.

A preferred embodiment of the tool 200 is easy to assemble, and rotate around the motor shaft with a minimum of effort. Another embodiment of the tool splits into four quadrants as shown in FIG. 3. The tool can be quickly assembled around a static motor shaft/coupling, as depicted in FIG. 8. It will be understood by one of skill in the art that this type of vertical alignment demands precision centering and a constant motor-shaft relationship to the windings-bearings prior to aligning the motor as a solid unit.

With the electrical and mechanical center of the motor alignment verified during motor assembly, the motor shaft 115 is verified to be centered within its bearings (i.e., the mechanical center) as the first step of the present alignment process. Since use of the tool removes the requirement of the motor shaft 115 to rotate, the possibility of motor shaft 115 movement within its bearing clearances, during rotation, adversely affecting pump/motor shaft alignment is also removed.

There are many types of instruments 650 that can be implemented in using the tool 200. In an exemplary embodiment, a dial indicator 655 is used. Indeed, the dial indicator 655 is the most common type of instrument used for motor alignment. An example of a dial indicator 655 that can be used is made by STARRETT of Athol, Mass.

The dial indicator 655 has a short stem, which when forced inward against a return spring will register up to approximately 0.200 inches of motion. Typically, the dial indicator 655 is adjusted to about one-half of the travel range (i.e., approximately 0.100 inches) on the stem and an adjustable dial can be aligned with a zero located directly under the point of a needle. In this arrangement, the dial indicator 655 in a complete circuit of motion can register up to a total of approximately 0.200 inches of positive or negative readings per what is available at various azimuths of the full 360 degrees rotation. Thus, the motor 105 can be moved from north to south or from east to west, in distances closely monitored by the dial indicator 655. Moving the motor 105 a slight or small amount can mean a few pennies to thousands of dollars in difference in the price of the next item that is purchased. Clearly, the more effectively and accurately the dial indicator 655 readings are taken and used, the more fuel efficient the machine can run, which can result in longer fuel supply.

FIG. 8 illustrates an assembled tool, in accordance with an exemplary embodiment of the present invention. Occupying the space where a spool 135 can be located, the tool 200 initially is aligned to the motor shaft 115 by indicating, as shown. Caution should be taken if the motor-to-coupling keyway is a factor. Once the tool 200 is properly aligned to the motor shaft 115, the dial indicator 655 can be adjusted to obtain readings. These readings can be obtained from the face and either inside or outside a rim of a stuffing box (see FIGS. 9-10). The information obtained includes factors that can be applied in custom formulas, which reveal an accurate representation of where the true axis of the motor shaft is in relation to the axis of the pump. Assuming out-of-tolerance readings are obtained from the face of the stuffing box of the pump, measure and record the north, side, east, and west readings, and then proportionally company the readings to the applicable motor hold-down bolts (bolt diameter) to determine the necessary shim packaged around the bolt diameter.

In this process, the actual motor shaft 115 has not been rotated in any direction. All motor shaft 115 rotation is performed by proxy via the tool 200. Thus, inaccuracies, uncertainties, and physical dangers to the conventional pry bar method of rotating the motor have been avoided and essentially eliminated. The next time the motor is rotated is when an operator, in a remote control room, punches a "go" button.

Again, the alignment tool 200 is coupled to the motor coupling 120 of a motor 105. The rotatable ring 215 includes the connected measuring tool 650, which extends from its perimeter. The measuring tool 650, as shown, is a dial indicator 655. As the rotatable ring 215 rotates about the motor shaft 115, because the extension arm 675 is fixed, the measurements can be taken to determine the center of the motor 105.

In FIG. 9, the alignment tool 200 is shown coupled to motor coupling 120 of the motor 105. The measuring tool 650 extends downward to the pump 110. This figure illustrates the measuring of the alignment assembly 200 with respect to the pump's stuffing box rim 665.

In FIG. 10, the measurement of the alignment tool 200 with respect to the pump's stuffing box face 670 is illustrated.

Figure 11:
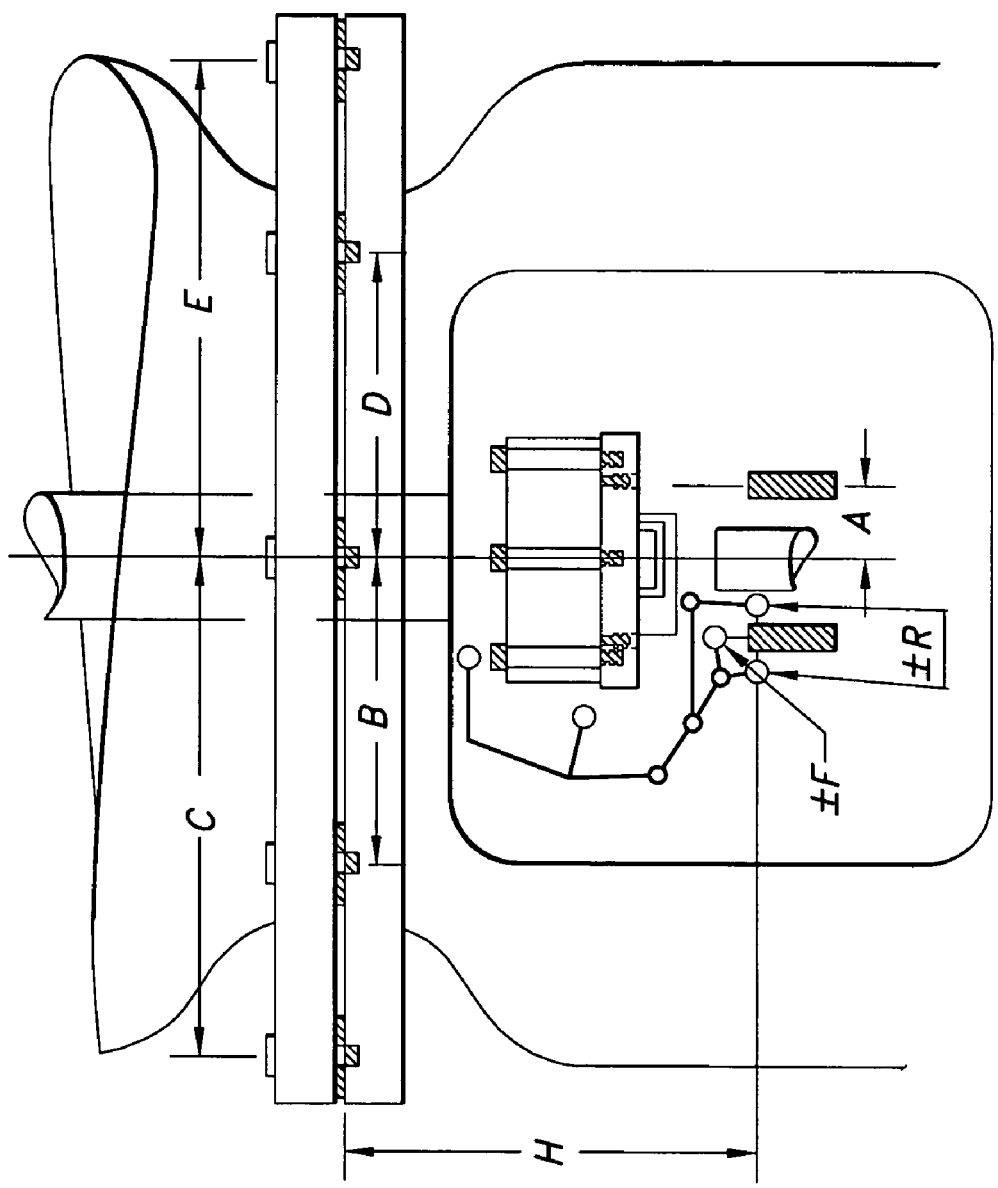
FIG. 11 illustrates numerous indicator measurements and dimensions for the alignment assembly, in accordance with an exemplary embodiment of the present invention.

FIG. 11 illustrates numerous indicator measurements and dimensions, in accordance with an exemplary embodiment of the present invention. A dimension ±R indicates two rim indicators. Caution should be taken when taking these readings, as different formulas are to be used when taking an inside reading versus an outside reading.

The lettered dimensions, in FIG. 11, labeled B, C, D, E, and H can, preferably, be obtained within the nearest ⅛ of an inch. Particularly, dimension A should be obtained to the closest scale reading. Additionally, dimensions ±F and ±R can be obtained to the nearest mil reading. With these precautions, the application of a rotary unit, and utilizing the correct formulas applied to the dimensions of the indicator readings, the actual alignment becomes a matter of simply aligning and shimming. Consequently, the use of the tool 200, sequences and using specific formulas, improve the prior limitations of aligning pumps and motors.

Shim changes can also occur. Shim changes do more than squaring a lower motor flange to the face of a pump stuffing box. Indeed, it aims the axis of the motor shaft 115 to where the axis of the pump shaft 125 belongs.

Regardless as to how the indicator readings are obtained, it is easy to view the motor flange from two directions 90 degrees apart and then calculate shims either left or right. In this manner, wherever shims must be removed, the shims are simply placed at the corresponding shim points on the opposite sides of the center.

In an exemplary embodiment, excessive vibrations, overheating, possible smoking of the pump pack, and a premature overhaul of the pump and motor can be prevented. First, the motor shaft 115 can be placed in the center of the mechanical or magnetic center before aligning. Second, the motor 105 can be aligned to the pump 110 within less than a mil on the face reading of the indictor and similar readings on the rim. Third, concentricity of the established motor shaft axis during the alignment process should not be disturbed. Conversely, this process can be accomplished by a different ordered approach.

Figure 12:
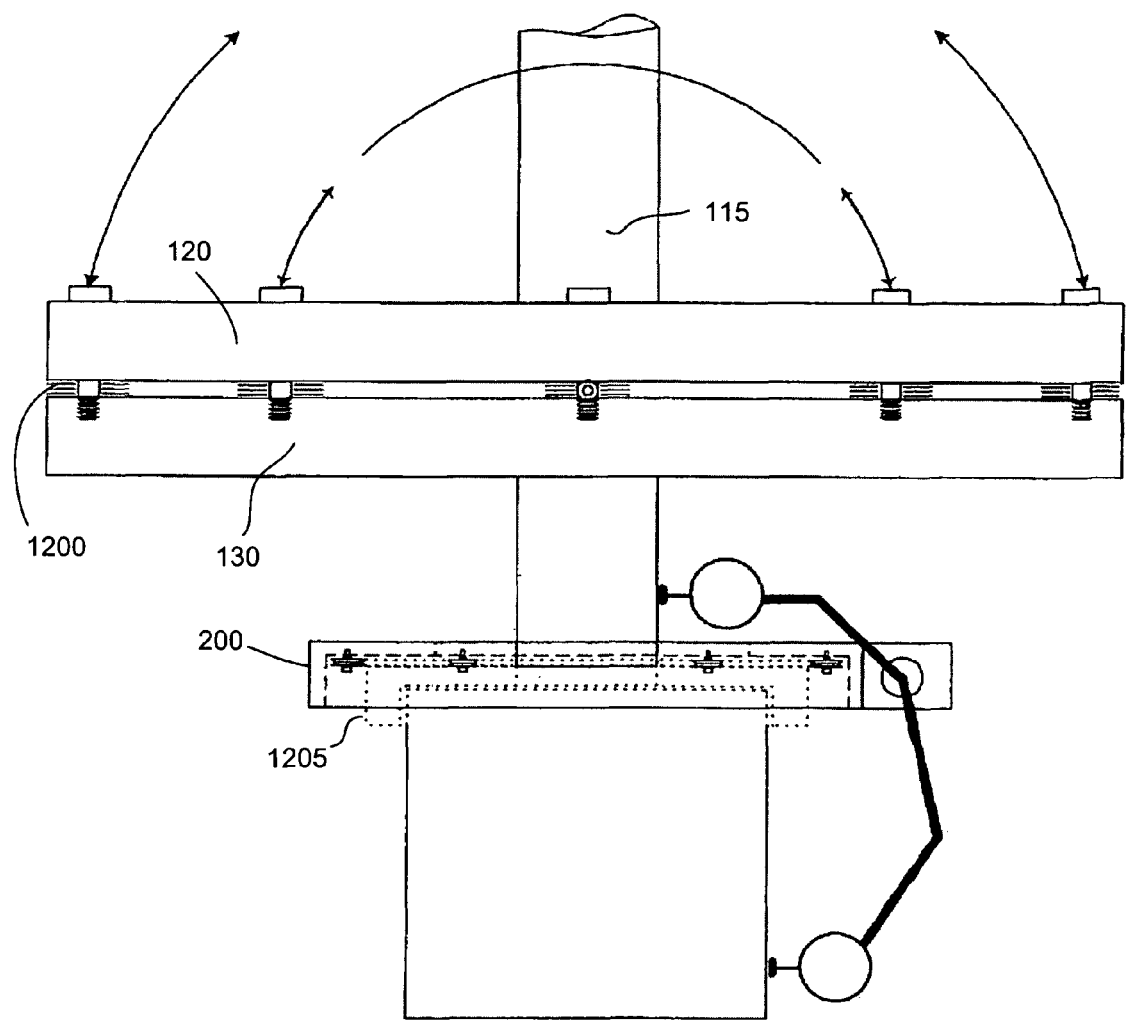
FIG. 12 illustrates a perspective view of a mock up profile of the tool, in accordance with an exemplary embodiment of the present invention.

FIG. 12 illustrates a perspective view of a mock up profile of the tool, in accordance with an exemplary embodiment of the present invention. This figure illustrates the airspace 1200 of a pump coupling 130 which is typically approximately ½ inch below the motor coupling 120. After the above rotary is centered to the motor shaft 115 the readings around the lower rim of the motor coupling can next be obtained. The motor shaft 115 is static, and it only takes a small amount of pressure to turn the tool 200 (i.e., fingertip pressure). Vertical jacking screws in a center track, identified with a dotted line 1205 in FIG. 12, are used to align both halves with the motor shaft in both the N/S and E/W planes. A reading from the upper indicator position should be obtained, which can result in a possible adjustment and then the readings on the indicator arm down to the rim and face should be obtained.

With the motor shaft centered at both the upper end and lower end, the entire motor can be centered and aligned with the stuffing box of the pump. Consequently, the inefficient, inaccurate, and dangerous methods of rotating the motor shaft have been eliminated. The large motors can be aligned with the pump and the only time the motor shaft must be turned can be done remotely (i.e. with a control room button).

The tool 200 can be sized to fit virtually any vertical pump. The benefits of this tool can be used to help the industry decrease component out of service time and to reduce the risk of component degradation due to motor/pump misalignments by increasing the alignment precision. Reduction in component degradation increases component reliability and minimizes maintenance costs. A direct impact of this tool to the industry is to prevent injuries due to mechanically rotating the motor in order to take indicator readings.

As a result of these measurements, the necessary shifting or adjustment of the moveable element, which is typically the motor 105, the alignment is complete.

From the foregoing, it can be seen that the invention provides an improved method of aligning the centerlines of two components. The embodiments of the invention described above provide an alignment assembly to improve the process of aligning a motor to a pump. Thus, unlike prior approaches, the alignment assembly accelerates alignment time, saves money, and improves precision of alignment.

It will be appreciated by those skilled in the art, however, that the invention can be embodied in other specific forms without departing from the spirit or essential characteristics thereof. The concepts described herein need not be limited to these illustrative embodiments.

Additionally, the specific configurations, choice of materials, and the size and shape of various elements, could be varied according to particular design specifications or constraints requiring an alignment assembly constructed according to the principles of the invention. Such changes are intended to be embraced within the scope of the invention.

The presently disclosed embodiments are, therefore, considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. An alignment tool for aligning a driver to a pump, the alignment assembly comprising:
    a securing ring adapted to be carried by the driver;
    a rotating assembly carried by the securing ring; and
    a rotatable ring adapted to rotate about the rotating assembly,
    wherein the alignment tool is adapted to eliminate the need of rotating the driver to align the driver to the pump,
    wherein the securing ring includes a first portion and a second portion, and
    wherein the first portion of the securing ring is coupleable to the second portion of the securing ring.

2. The alignment tool according to claim 1, wherein the rotating assembly is a track having an outwardly extending flange from the securing ring.

3. The alignment tool according to claim 1, wherein the rotatable ring further includes at least two bearings, and wherein the bearings are carried by the rotating assembly.

4. The alignment tool according to claim 1, wherein the rotatable ring includes a first portion and a second portion, and wherein the first portion of the rotatable ring is coupleable to the second portion of the rotatable ring.

5. The alignment tool according to claim 1, wherein the driver is a motor, the motor having a motor shaft in communication with a motor coupling, and wherein the securing ring is coupled to the motor coupling.

6. A method of aligning a motor to a pump, the method comprising:
    providing an alignment tool coupled to the motor, the alignment tool having a portion being rotatable about the motor;
    indicating the alignment tool to the motor;

shifting the motor to correct for misalignment between the motor and the alignment tool; and indicating the alignment tool to the pump, wherein the indicating the alignment tool to the pump is performed by indicating to a stuffing box of the pump.

7. The method according to claim 6, wherein the indicating the alignment tool to the pump is indicated at the stuffing box of the pump, further including indicating to a top rim and an inner ring of the stuffing box.

8. A system of aligning a motor to a pump, the motor including a motor shaft in communication with a motor coupling, the pump including a pump shaft in communication with a pump coupling, the system comprising:

a securing ring adapted to be carried by the motor coupling, the securing ring including a first portion coupleable to a second portion, and the securing ring having a perimeter;

a track carried by the perimeter of the securing ring, wherein the track includes an outwardly extending flange from the perimeter of the securing ring; and a rotatable ring having at least two bearings for rotating about the track, the at least two bearings carried by the track, wherein the bearings being carried by the track enable rotation of the rotatable ring, wherein the rotatable ring enables a non-rotation of the motor shaft for the aligning, and the rotatable ring performs the rotation.

9. The system according to claim 8, wherein the rotatable ring comprises a first portion and a second portion, and the first portion of the rotatable ring is coupleable to the second portion of the rotatable ring to form a ring shape.

10. The system according to claim 9, further comprising a tool connection member outwardly extending from a perimeter of the rotatable ring to accommodate a measuring tool to be connected to the rotatable ring.

11. The system according to claim 10, wherein the measuring tool is from the group consisting of a dial indicator, a digital dial indicator, a laser, a C-frame adaptor, and a D-frame adaptor.

12. The system according to claim 8, wherein at least one of the at least two bearings comprises a grooved roller bearing adapted to receive the track and configured to rotate the rotatable ring about the track.

13. The alignment assembly according to claim 8, wherein the rotatable ring includes a top and a bottom, the bottom defining a cavity for receiving the at least two bearings.

14. A method of aligning a motor to a pump, the motor comprising a motor shaft in communication with a motor coupling, the pump including a pump shaft in communication with a pump coupling, the method comprising:

coupling an alignment tool to the motor, the alignment tool comprising a first portion rotatable about the motor shaft and the motor coupling, and a second portion adjustable to indicate to the motor shaft, motor coupling, and pump;

measuring a first misalignment, the first misalignment measured between the alignment tool and the motor shaft, the measuring of the first misalignment comprising moving the first portion of the alignment tool about the motor shaft to indicate at multiple locations of the motor shaft with the second portion of the alignment tool;

shifting the motor shaft to correct for the first misalignment between the alignment tool and the motor shaft;

measuring a second misalignment, the second misalignment measured between the alignment tool and the motor coupling, the measuring of the second misalignment comprising moving the first portion of the alignment tool about the motor coupling to indicate at multiple locations of the motor coupling with the second portion of the alignment tool;

shifting the motor coupling to correct for the second misalignment between the alignment tool and the motor coupling;

measuring a third misalignment, the third misalignment measured between the alignment tool and the pump, the measuring of the third misalignment comprising moving the first portion of the alignment tool about the motor shaft or the motor coupling to indicate at multiple locations of the pump with the second portion of the alignment tool;

shifting the motor to correct for the third misalignment between the alignment tool and the pump; and repeating one or more of the above steps until the motor is aligned to the pump.

15. The method of alignment according to claim 14, wherein the measuring of the first misalignment further comprises determining the angular misalignment between a centerline of the alignment tool and a centerline of the motor shaft, motor coupling, or pump, wherein the measuring of the second misalignment further comprises determining the angular misalignment between the centerline of the alignment tool and a centerline of the motor coupling, and wherein the measuring of the third misalignment further comprises determining the angular misalignment between the centerline of the alignment tool and a centerline of the pump.

16. The method of alignment according to claim 15, wherein the measuring of the third misalignment further comprises indicating to a stuffing box of the pump with the second portion of the alignment tool.

17. The method of alignment according to claim 16, wherein the measuring of the third misalignment further comprises indicating to a top rim of the stuffing box.

18. The method of alignment according to claim 16, wherein the measuring of the third misalignment further comprises indicating to an inner face of the stuffing box.

* * * * *